US005156329A

United States Patent [19]

Farrell

[11] Patent Number: 5,156,329

[45] Date of Patent: Oct. 20, 1992

[54] SEAL TESTABLE CONTAINER STRUCTURE

[75] Inventor: Christopher J. Farrell, Arlington Heights, Ill.

[73] Assignee: American National Can Company, Chicago, Ill.

[21] Appl. No.: 748,231

[22] Filed: Aug. 7, 1991

Related U.S. Application Data

[63] Continuation of Ser. No. 333,500, Apr. 15, 1989, abandoned.

[51] Int. Cl.[5] .......................... G01M 3/36; B65D 1/34

[52] U.S. Cl. ................................ 229/125.35; 73/49.3; 73/52; 220/359

[58] Field of Search ...................... 229/125.33, 125.35; 220/232, 240, 359; 73/45.4, 49.3, 52

[56] References Cited

U.S. PATENT DOCUMENTS 3,192,091 6/1965 Hey et al. ........................ 229/125.35
3,207,415 9/1965 Schechter ........................ 229/125.35
3,480,197 11/1969 Massey ........................... 229/125.35
3,973,249 8/1976 Yokote et al. ...................... 73/49.3
4,187,798 2/1980 Yoshimura .......................... 73/49.3
4,355,755 10/1982 Faller .............................. 229/2.5 R
4,409,818 10/1983 Wyslotsky et al. .................. 73/49.3
4,427,148 1/1984 Seiter et al. ......................... 220/309
4,517,827 5/1985 Tapscott ............................. 73/49.3
4,605,142 8/1986 Itoh et al. ........................... 220/359
4,659,405 4/1987 Walter ............................... 220/359
4,689,099 8/1987 Ito et al. .......................... 229/125.35
4,706,494 11/1987 Creed et al. ........................... 73/52
4,747,298 5/1985 McDaniel ............................. 73/52
4,747,299 5/1988 Fox et al. ............................... 73/52
4,768,376 9/1988 Lanham et al. ...................... 73/49.8
4,771,630 9/1988 Croce et al. ............................ 73/52
4,774,830 10/1988 Hulsman ............................. 73/49.3
4,899,574 2/1990 Polteiger ............................ 73/49.3

OTHER PUBLICATIONS

Search Report PCT/US90/01760.
"More Surety for the Seal," Packaging Digest, pp. 6,28 (Mar. 1989).
Confidential Materials Submitted Pursuant to M.P.E.P. §724.02.
Rice, J., "Packaging QC Prepares 'get in the groove'", Food Processing, Mar. 1989.

*Primary Examiner*—Gary E. Elkins
*Attorney, Agent, or Firm*—Robert A. Stenzel

[57] ABSTRACT

Methods and systems for testing the seals of container lids to the top portion of container bodies are provided. Testing the integrity of the seal is achieved by injecting fluid under pressure under the lid portion of the container and detecting if the lid bulges outwardly with respect to its at-rest position prior to injecting fluid. A container adapted to having the seal tested for leakage is also provided.

28 Claims, 6 Drawing Sheets

SEAL TESTABLE CONTAINER STRUCTURE

This application is a continuation of U.S. application Ser. No. 07/333,500, filed Apr. 15, 1989, now abandoned.

BACKGROUND OF THE INVENTION

1. Field of the Invention

The present invention relates to the testing of the integrity of the seal securing a container lid or closure on a container body and a container structure whose seal is adapted to be tested.

2. Description of the Related Art

At the present time comestibles such as yogurt, cheese spread or other perishable items, are often packed in containers of various types, such as bowls, trays and other containers which are opened by peeling off their lids. The containers may have any shape and configuration, for example, cylindrical, rectangular, oval, oblong, etc. One type of container has a bowl-like body, a bottom wall and a flexible lid.

The lid usually is, but need not be a multi-layer sheet or laminate, preferably flexible in the form of a thin, flexible disc. The lid may consist of layers of plastic which are laminated on opposite sides of a layer of aluminum foil. The bottom layer of the lid is usually a heat-sealable or adherable plastic. The container body is filled and its lid is placed on a top surface usually the flange, of the container body. The outer peripheral portion of the lid, at its bottom face, is hermetically sealed or adhered to the flange.

If the lid-flange seal has even a tiny hole, void or interruption micro-organisms may enter the container and spoil the food or other perishable product. Such spoilage may cause consumers to reject the brand of the product in the future. The consumer may resent having the inconvenience of discarding the container or returning it to the store. In addition, the spoiled food, if eaten, may cause illness, and may also seriously damage the reputation of the manufacturer and/or food producer or packer.

Food manufacturers are aware of the danger of spoilage due to seals which are not hermetic, and seek to prevent such faults by quality inspection of their filled containers. Generally, such quality inspection in the case of high acid food products includes testing for faulty seals by pulling a few containers from the production line and visually testing them for leakage. That type of quality control, based on a statistically meaningful random sample, is well adapted to detect machine errors which cause faulty seals on all the containers in a production run. However, statistical quality control is not well adapted to detect random faulty seals, for example, a pin hole in the seal of one container out of a production run of 10,000 containers.

It is realized that it would be preferable for high acid foodstuffs and it is generally required for low acid sterilized, i.e., retorted shelf-stable foodstuffs, to test each and every container, which is called "100% testing". The ideal is to test each container twice, called "200% testing". Such testing for retortable containers would preferably be accomplished before and after the filled, sealed container and its contents are sterilized. For filling, sealing and packing operations high speed is preferred. To be compatible with such filling, sealing and packaging systems, seal integrity testing systems should run at similar high speeds.

The seal area of containers of low acid foods having a heat-sealed lid are presently being individually visually 100% inspected rather than automatically tested by machine, due to the difficulty of such testing at the requisite high speeds of production. Several leak detection systems have been in development to solve the problem of high speed automatic testing of package seal integrity in a non-destructive way. Electronic, thermal and pressure differential systems have been proposed. However, for one reason or another there are problems with each of these systems and none is totally successful in addressing all the needs of a fully commercial testing system. The system should be fast and must be sensitive, non-destructive, automatic, reliable and accurate.

OBJECTIVES AND FEATURES OF THE INVENTION

It is an objective of the present invention to provide a system and method of testing the previously discussed containers, particularly the seal of lids to container bodies in which the seal integrity of every filled container is tested at least once, ideally twice, i.e., 200% testing.

It is a further objective of the present invention that the seal testing be accomplished at a sufficiently high speed so that such testing is fully compatible with the speed of production of the filling operation.

It is a further objective of the present invention that such testing not add appreciably to the per-unit cost of production.

It is a further objective of the present invention that such testing provide a fully accurate test of each seal and be of sufficient accuracy to detect tiny openings through the seal of even pin-hole size.

It is a still further objective of the present invention to provide a container body construction which is particularly adapted to the testing systems and methods of the present invention.

It is a still further objective of this invention to provide an on-line, non-destructive system and method for testing the seal integrity of plastic containers having sealed or adhered covers or lids.

It is another objective of this invention to provide the above mentioned method and systems which are automated and preferably effected at high speeds compatible with high container fill and seal, line speed.

SUMMARY OF THE INVENTION

In accordance with the present invention, there are provided methods and systems for testing the seal of container lids to the top portion preferably a top surface, e.g., lip or flange or both of container bodies. Each container, after it is filled and the cover is secured or sealed to the flange, is tested once, optionally twice, i.e., 200% testing. If any holes are found which extend through the seal, in either of the tests, the container is rejected.

The container body can be made of any suitable material(s) and can be of any suitable design, shape or configuration and has an upper terminal end portion usually defining the mouth of the container, preferably having an outwardly extending flange which extends from its top lip. The terminal end portion may be of any suitable shape, for example, cylindrical, rectangular or oval. A portion of the terminal end portion of the container body preferably a top flattened surface of the lip or flange, is secured to the lid. The lid or cover can be of any suitable materials or construction and preferably comprises a plastic-containing laminar or flexible sheet. An example of such a multi-layer lid would comprise, a bottom layer cf plastic polymeric material for heat-sealing, a core layer of a metal foil and a top layer of plastic polymeric material which preferably may be printed upon. The upper terminal end portion of the container body has means adapted for the testing of the present invention. In preferred embodiments, the lip or flange, preferably the latter, has means for introducing a testing medium to or into the seal between the lid and the surface of the terminal end portion of the container body, e.g., a peripheral channel which communicates with the lid/seal area of the container body, and means for introducing a testing medium into the peripheral channel. The introducing means can be at least one, preferably two passageways, routes or openings extending from and through an outer portion, edge or surface of the terminal end portion, for example, from and through the outer side wall of the flange and leading to and communicating with the channel. In one embodiment each opening is a radially aligned bore, i.e., a round hole, and in another embodiment each opening is a: radial groove.

The peripheral channel in the lip or flange forms a passageway which extends about the inner annular portion of the lid-flange seal. A suitable fluid is pumped, at high pressure, through the route(s) or opening(s) into the channel. If there is a leak in the seal, the fluid will pass through the leak and into the container, expanding (bulging) the cover upwards. That expansion is detected by suitable means such as a linear transducer and the containers whose covers flex or bulge upwards under the fluid pressure of the test are by suitable means identified and rejected.

The system includes a high-speed automatic machine which, in sequence, vertically moves a clamping ring to clamp, for example, the outer portion of the rim or flange of a sealed container, injects gas through the opening, and then lifts the clamping fixture. The faultily sealed container(s) is or are then rejected from the line.

The above and other objectives of the present invention will be apparent from the detailed description provided below, which should be taken in conjunction with the accompanying drawings.

BRIEF DESCRIPTION OF THE PREFERRED EMBODIMENTS

Figure 3:
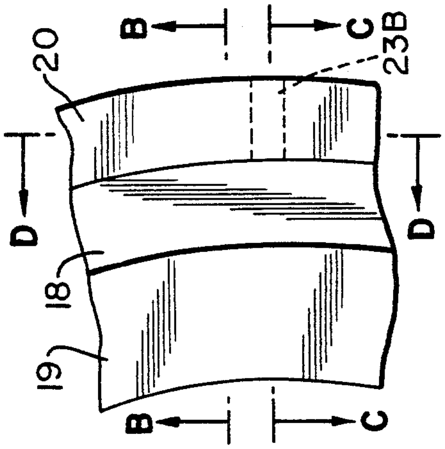
FIG. 3 is a greatly enlarged top sectional plan view of a portion of the container body flange shown within the dash-dot circle of FIG. 1.

As shown in FIGS. 1–4B, the preferred container of the present invention includes a flexible lid 10 (FIG. 4B) and a container body 11 here shown in the form of a bowl or tub. The container body 11 is preferably formed of one or more suitable plastic resin(s) and has a frustoconical or downwardly and inwardly tapered side wall 12 (round in horizontal cross-section) and an integral bottom wall 13. Alternatively, and not shown, the side wall may be of any suitable shape, for example, squared, rectangular, cylindrical, rounded, barrel-like, etc. in cross section. The upper terminal end portion of the container body has an integral top edge, here shown as comprised of an annular flange or lip 15, which extends radially outward from the top opening 16 of the container body 11.

The flange 15 has a flat &op face 17 and includes means for introducing a testing medium into or against the seal between the lower face of the lid and top face 17, the means being shown as a peripheral or annular channel 18 which can but need not be, a groove or score line, which divides face 17 into an inner annular portion 19 and an outer annular portion 20. The bottom face of lid 10 is secured preferably sealed or adhered, at least to the inner annular portion 19. Regardless of whether the seal also extends about the outer annular portion 20, only the seal integrity of the seal about the inner portion 19 is tested.

The outer portion 20 of the flange 15 includes means for introducing a testing medium into channel 18. Such means can be a single route or opening but, as here shown, preferably it includes two routes or openings 23A, 23B which extend radially inward from and through the outer side face or edge 22 of the flange and communicate with channel 18. Openings 23A, 23B need not be positioned as shown, i.e., 180° apart on opposite sides of the flange. They may be placed in any suitable location or arrangement. The openings 23A, 23B can be of any suitable type, shape, configuration or direction. Preferably they are grooves, slits, cuts or channels formed or cut in the flange and preferably they are radial and perpendicular to the imaginary central axis 41 of the container body.

Figure 5:
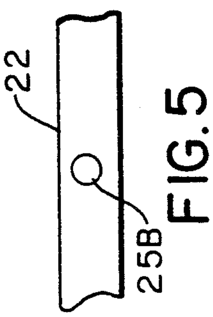
FIG. 5 is a side plan view of a portion of a flange showing a second embodiment cf the present invention.
Figure 1:
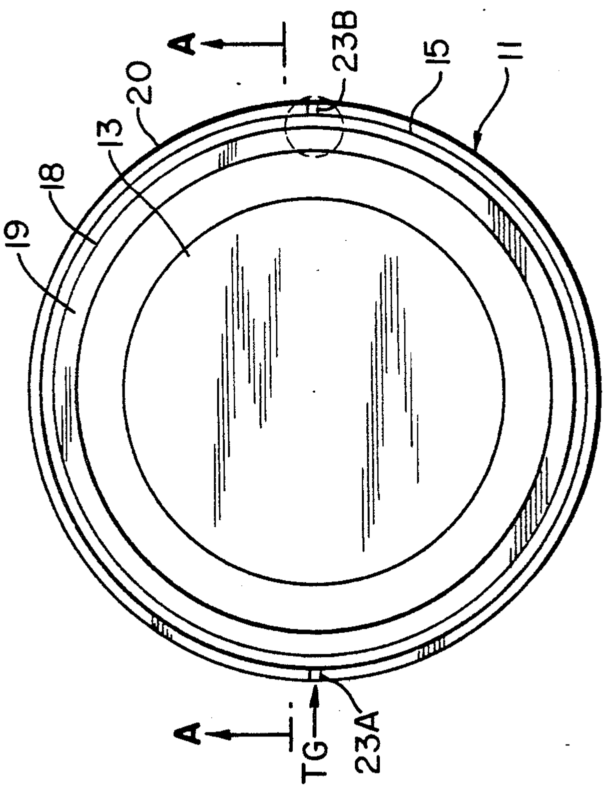
FIG. 1 is a top plan view of a container body without a lid, showing the preferred first embodiment of the present invention.
Figure 2:
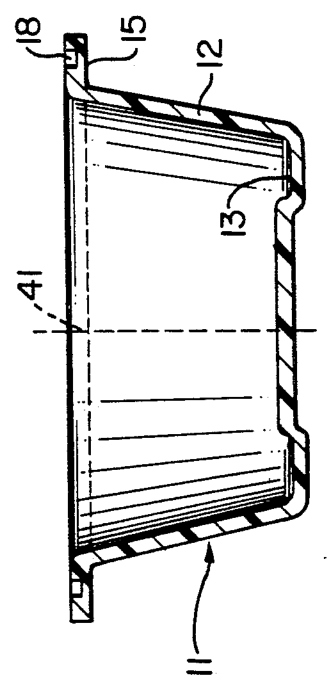
FIG. 2 is a side cross-sectional view taken along line A—A of FIG. 1.
Figure 4A:
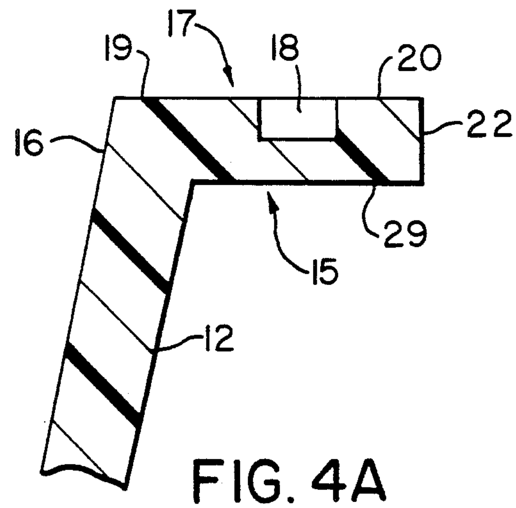
FIG. 4A is a cross-sectional view taken along line B—B of FIG. 3.
Figure 6:
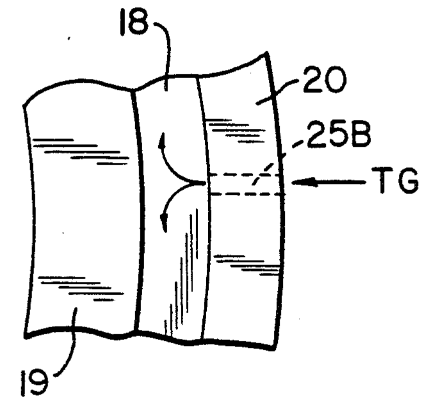
FIG. 6 is a top plan view, similar to FIG. 3, but of the second embodiment of the present invention shown in FIG. 5.
Figure 4B:
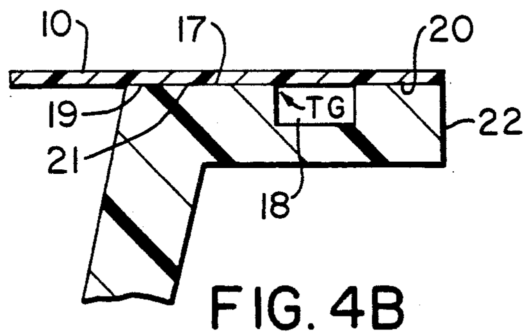
FIG. 4B is a cross-sectional view similar to FIG. 4A but with the lid sealed in place.
Figure 7:
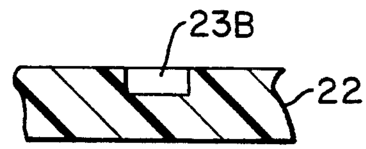
FIG. 7 is a vertical sectional view of a portion of a flange taken along line D—D of FIG. 3 showing the first embodiment of the invention.
Figure 4C:
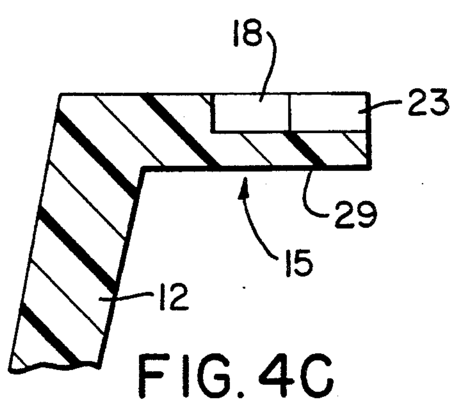
FIG. 4C is a cross-sectional view taken along line C—C of FIG. 3.

In the embodiment of FIGS. 5 and 6, bores 25A, 25B (only 25B is shown) are employed as the openings instead of the grooves 23A, 23B. The grooves 23A, 23B are easier to form in the container body, but should be narrow enough to prevent passage of the testir g gas between the lid and the clamping ring into the testing chamber, especially when the lidstock is thin. The test gas TG introduced through the openings is distributed by channel 18 around and tests the entire periphery of the seal 21 at or between the bottom face of the lid 10 and the flange inner annular portion 19, (See FIG. 4B).

In both embodiments, when gas TG is injected into the channel 18 through the openings, the gas will travel through and completely around channel 18 and the seal 21. If there is any hole, void or interruption through seal 21, even a pin-prick size hole or a weakness in the seal which will not withstand the gas pressure, the gas will enter the container and expand, bulge or move the cover upwardly. Such bulging, expansion or movement of lid 10 will be sensed by suitable means, for example, by a linear proximity transducer 26. The defective container is identified or noted by suitable means. Means, for example and preferably, a computer-based digital memory will, in effect, note and remember the position of the identified defective container in the production line and reject it from or after it exits from the testing station.

Figure 8A:
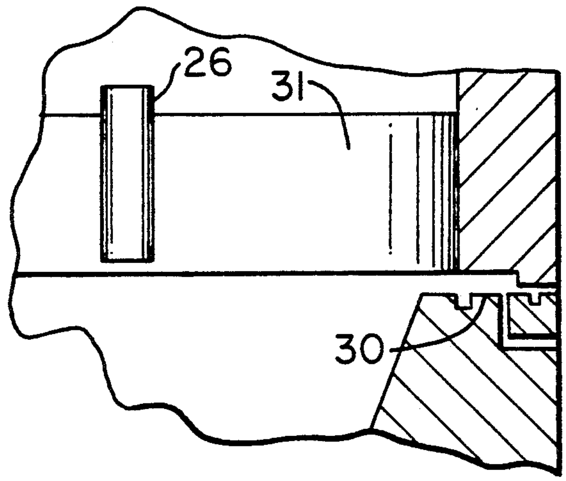
FIG. 8A is a vertical cross-sectional view of a portion of an apparatus for testing the seal integrity of a plastic container in accordance with the present invention.

The testing apparatus, shown in FIG. 8A, is a machine to automatically, and at high speed, provide a 100% seal integrity test. The embodiment of FIG. 8A is only illustrative of one possible testing machine design. Since the testing station should be integrated into or used in or with different types of production lines for different containers and products, it may be constructed using various mechanisms. In all cases, however, it will be adapted to provide a 100% test and preferably utilized twice or at two locations for a 200% test, by injecting gas, under pressure, through the two openings. If only one opening is used, and that opening is blocked, or there is a blockage in the channel at the junction of the channel and the opening, the test may appear satisfactory, i.e., a false positive reading because the cover does not bulge, and yet there may be a leak through the seal 21. That type of false positive is avoided by introducing the gas, simultaneously, through two or more widely separated openings. The gas enters the channel through the two openings each time the seal integrity is tested. The openings also permit air to enter and diffuse through the channel after the container is packed. This tends to help keep the channel dry.

Figure 8B:
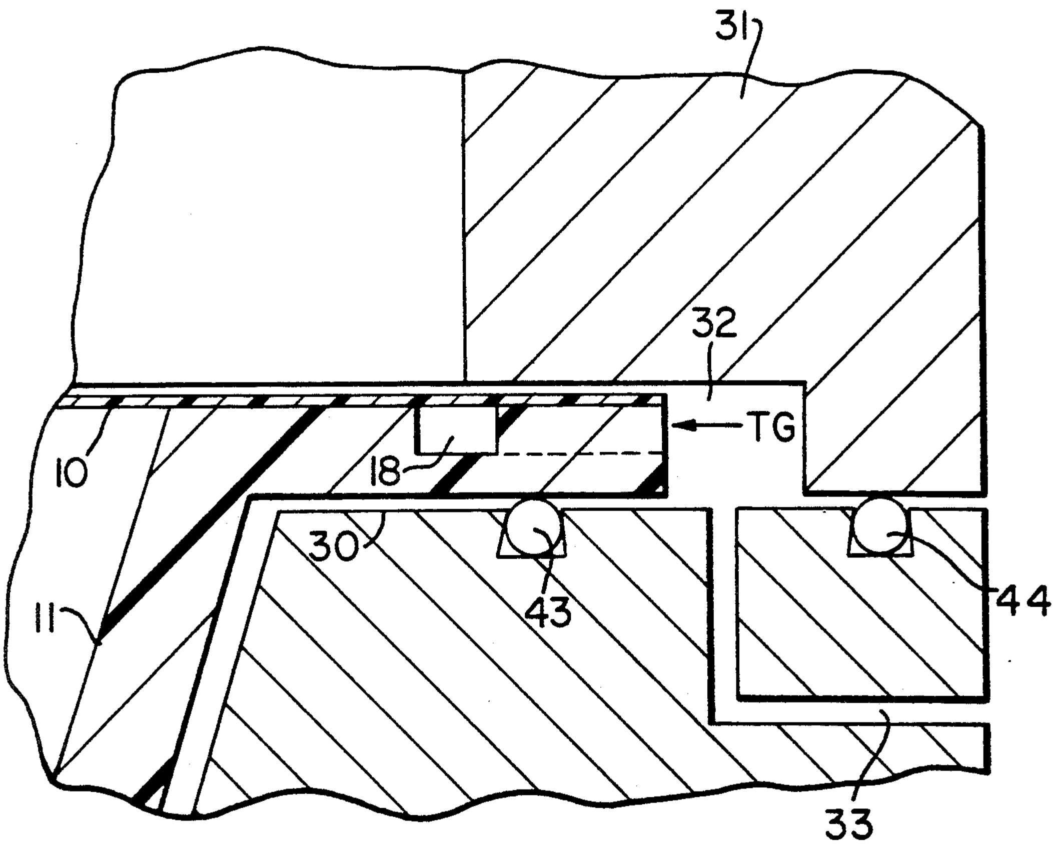
FIG. 8B is an enlarged view of a portion of the apparatus of FIG. 8A with a container in the apparatus.

As shown in FIGS. 8A and 8B, the container, after being filled and having the lid 10 heat-sealed or otherwise secured or adhered to the flange 15, is automatically positioned in a suitable testing apparatus by a conventional transfer mechanism (not shown). In the apparatus, the bottom face 29 of the flange 15 rests on the fixed support ledge 30. A vertically movable annular clamping ring 31 is then brought down to clamp flange outer annular portion 20, and partially but not completely over clamp channel 18, between the clamping ring 31 and ledge 30. The use of O-rings 43 and 44 provides a gas tight seal and forms an annular gas chamber 32. The gas inlet 33 is connected through a solenoid-operated valve to a high pressure gas supply (not shown). After the container 11 is clamped in position but before the pressure chamber 32 is pressurised, the proximity transducer 26 is read. At a parametric time during or after pressurization of chamber 32, the transducer 26 is read again. If a difference greater than a predetermined amount is sensed then this container will be earmarked for automatic rejection by simple means (not shown) after pressure release and the lifting of clamping ring 31.

Figure 9:
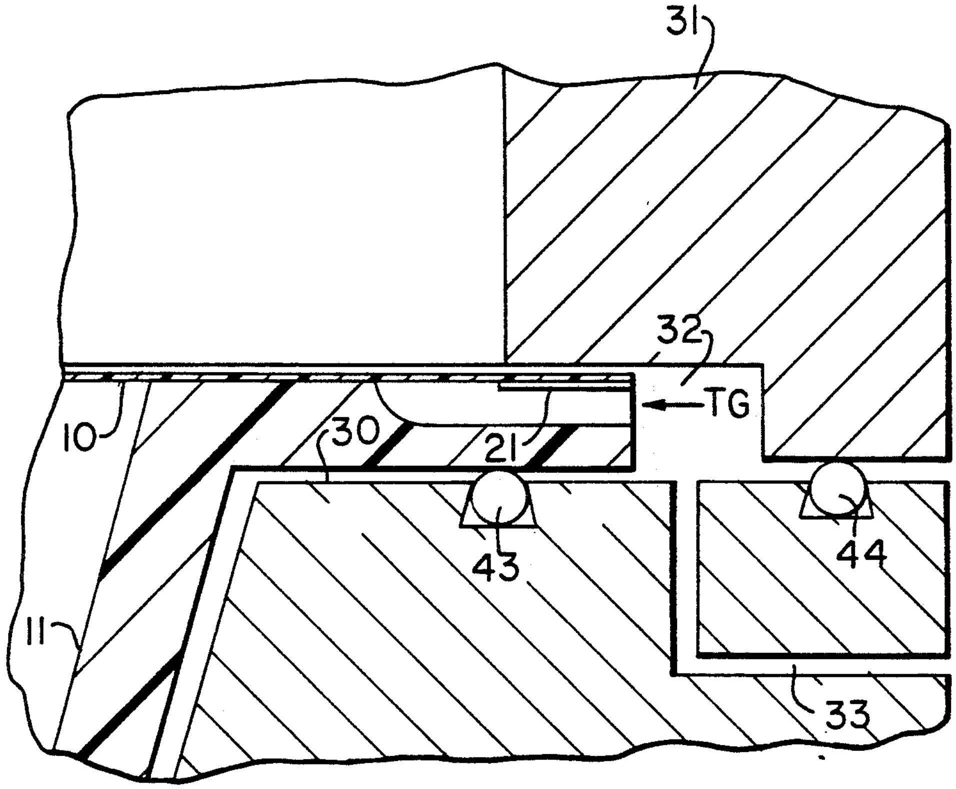
FIG. 9 is a vertical cross-sectional view of a second alternative apparatus for testing the seal integrity of a plastic container in accordance with the present invention, with a cross-sectional view of a portion of a container taken along line E—E of FIG. 10.
Figure 9B:
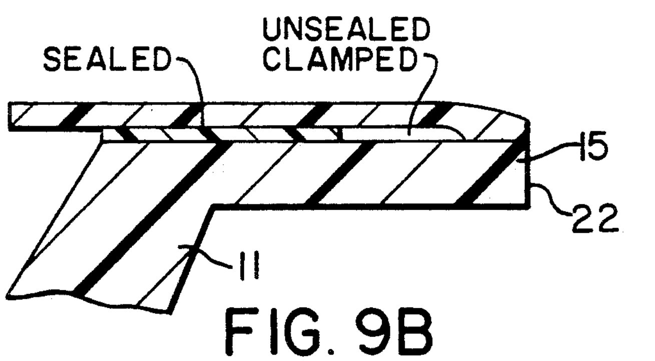
FIG. 9B is an enlarged vertical cross-sectional view of an altered embodiment of FIG. 9A.
Figure 10:
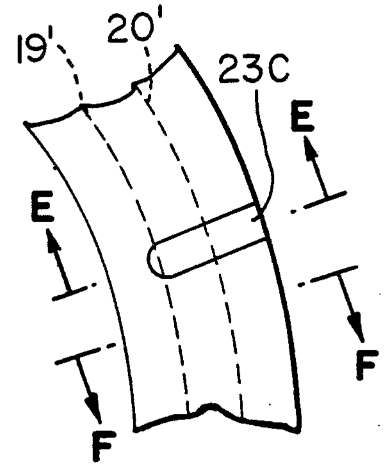
FIG. 10 is a top plan view, enlarged, of an optional flange structure of the flange shown in FIG. 9.
Figure 9A:
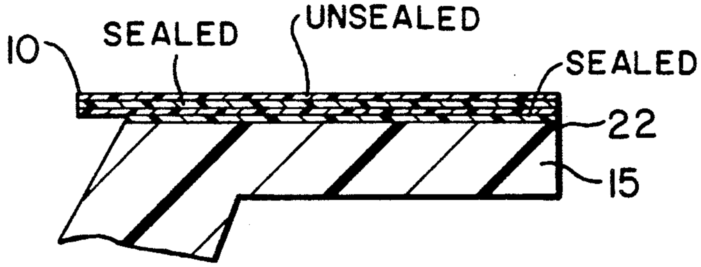
FIG. 9A is an enlarged vertical cross-sectional view of the embodiment of FIG. 10 taken along line F—F of FIG. 10.

In the embodiments of FIGS. 1–8, a circumferential channel 18 with openings 23A, 23B or 25A, 25B leading to circumferential channel 18 is employed in the flange 15 of container 11. The circumferential channel 18 may collect food due to splashing or otherwise during the filling operation, or collect dirt during processing or storage. This is unsightly and unhygenic. One possible and preferred solution is in a secondary operation, after testing, to cut off flange portion 20 with or without, preferably with all of the residual portion of the channel, that is the portion of the flange which forms the bottom of channel 18. To avoid this extra operation, an embodiment which dispenses with the circumferential channel 18 is desirable and preferred. One such embodiment is shown in FIGS. 9–10 in which the radial slots 23C penetrate further in towards the container axis 41 and further than the inner edge of clamping 31. In FIG. 9, a vertical section is shown taken along E—E FIG. 10 of such a container embodiment here shown in a testing apparatus. Test gas conveyed inwards by channel 23C moves around the circumference of the container in the natural channel provided by unsealed area of lid 10 between portions 19' and 2', of FIG. 10.

Figure 11:
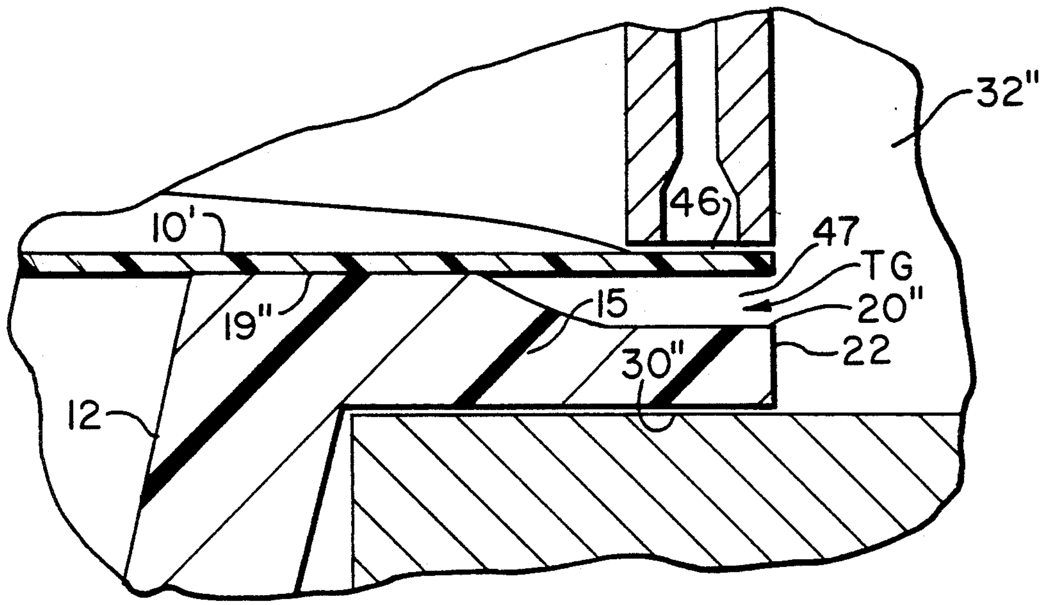
FIG. 11 is a side cross-sectional view of a third alternative apparatus for testing of the seal integrity of a container and of another embodiment of the container structure.
Figure 12:
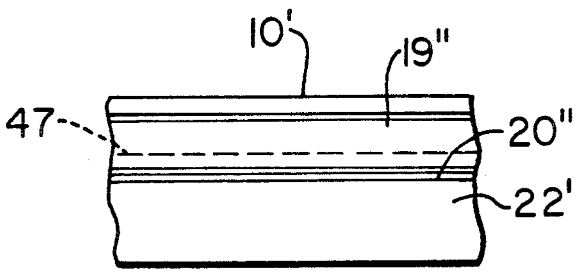
FIG. 12 is a side plan view of a portion of the container shown in a cross-sectional view in FIG. 11.
Figure 13:
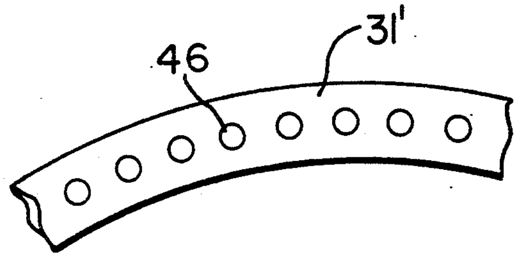
FIG. 13 is a bottom view, of a portion of the apparatus shown in FIG. 11.

The embodiment, illustrated in FIGS. 11, 12 and 13 does not use a peripheral channel or one or more individual grooves. In this embodiment, the flange 15'' has a raised inner annular portion 19'' and a depressed or offset outer annular portion 20''. This outer portion can merely be a sloping outer portion or edge as shown in FIG. 11. The testing apparatus, partly shown in FIG. 11, operates in the same manner as the apparatus of FIG. 8A. The container is transferred into the apparatus with its flange 15'' positioned on fixed ledge 30''. The lid 1', about its outer edge, preferably is held by vacuum up against the clamping ring 31' when the clamping ring 31' is lowered. The vacuum is applied, for example, through holes 46 in clamping ring 31'. The testing gas TG, shown by arrow TG, from chamber 32'' enters the gap 47 between the bottom face of the outer edge portion of lid 10' and outer depressed annular portion 20''. The gas tests the peripheral seal holding cover 10' to the inner annular portion 19''. As previously mentioned, preferably the seal is tested again at another location. After the seal integrity tests are completed, the container preferably is transferred to another station (not shown) where the bottom face of cover 10' at its outer edge may be secured or sealed to, for example, the outer annular portion of the flange, here shown as 20''.

Figure 14:
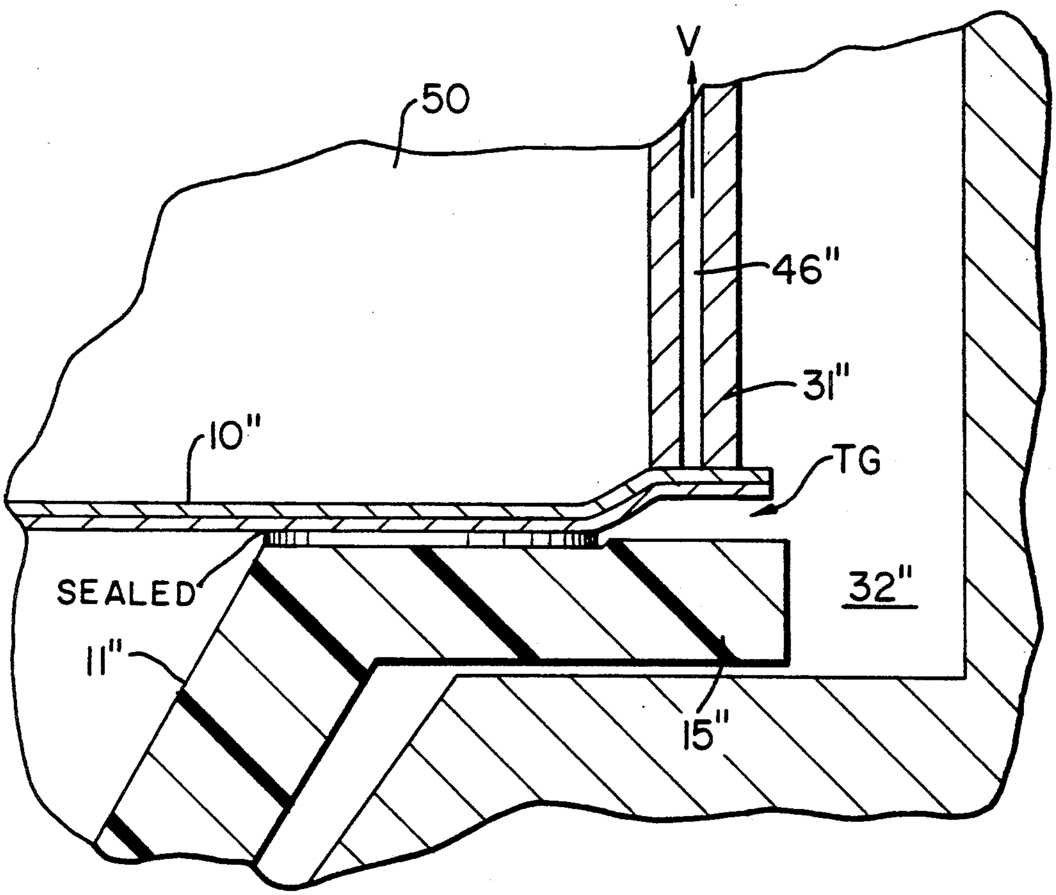
FIG. 14 is a vertical cross-sectional view of a fourth alternative apparatus for the testing of the seal integrity of a container.

The embodiment illustrated in FIG. 14 uses a conventional container having container body 11'', flange portion 15'' and lid 10'' whose bottom face, at its outer peripheral edge, is sealed to the top flat face of flange 15''. The flange 15'' does not have a channel, groove or hole. The integrity of the seal is tested by gas TG when the clamping ring 31'' is lowered near to or onto the lid 10" and a vacuum is applied to hole 46". An outer chamber 32" is temporarily formed by the clamping ring 31". When the gas from outer chamber 32" space is pressurized, ring 31" is lifted slightly. If there is a hole in the seal, gas will enter the container and cause the lid 10" to bulge outward, activating a transducer (not shown). The clamping ring, of the type shown in FIG. 13, uses vacuum V. After the seal integrity is tested the vacuum is shut off, the ring 31" is lifted from the lid 10" and the container is removed from the testing apparatus.

Modifications may be made in the above-described embodiments within the scope of the claims. For example, the container body shown in the drawings is bowl-shaped. However, alternatively, the container body may have arcuate or rounded portions or straight or flat sides and be triangular, rectangular, or have more than four side walls. As additional examples, the container body may be a right-sided cylinder, or cone shaped. It may be formed from one layer or multiple-layers of plastic or plastic and foil. It could also be a suitable composite material.

The flange 15 is shown, in the drawings, as a flat annular member, having a channel therein, which extends horizontally outwardly from the top of the container body, perpendicular to the imaginary axis of the container body. Alternatively, and not shown, the flange may extend outwardly at an incline or obtuse angle to the axis, or the flange may be parallel or downwardly angled relative to the axis, for example, an upward or downward extension of the side wall of the container body. The flange may also extend inward, i.e., toward the axis.

The embodiments, described above, show the flange 15 as an integral portion of the container body. Alternatively, and not shown, the flange may be a separate ring which is welded or otherwise connected to the body.

The container body terminal end portion need not include a flange. Instead, the channel 18 may be formed in the upper edge or lip of the container. For that purpose, the lip may be thickened compared to the container body's side wall.

The lid or cover 10 is described, in one embodiment, as a multi-layer flexible sheet. The cover may be of a single layer. It may be semi-rigid and need not be formed using a plastic film or laminate. It may be injection molded. The cover, however, must be able to flex, bend, bulge or expand due to the pressure of the testing gas to an extent as to be detectable by the testing apparatus employed and properly attributable to a seal leak.

The channel 18 and the grooves are shown as being U-shaped with square bottom corners. Alternatively, and not shown, the channel and grooves may have other cross-sectional shapes including rectangular, square, hemi-spherical and V-shaped. One peripheral channel is shown, however two or more channels, each communicating through grooves or bores to the side wall, may be utilized. There may be many grooves, openings or bores in the flange outer annular portion.

In the above-described embodiments, the cover is heat-sealed or otherwise adhered to the flange. Other sealing methods may be used, for example, a plastic cover may be spin welded to a container body, or the seal may be formed ultrasonically. The adhesive, for example, may be a heat set or a?

The gas used in the test is preferably air, preferably hot air, to help dry the channel, or it may be an inert gas such as nitrogen, helium or argon.

Figure 15:
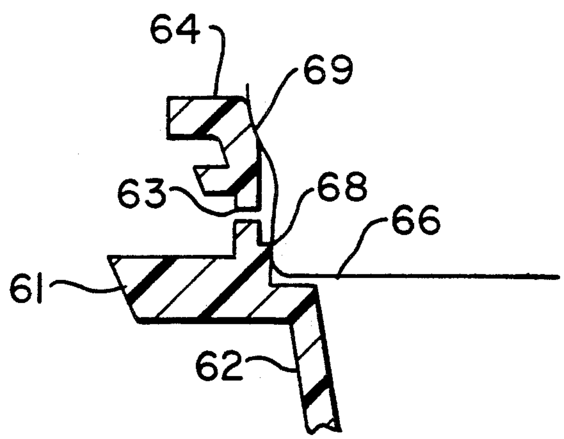
FIG. 15 is another embodiment like FIG. 9A where the lid is sealed to the inside surface of the container side wall.

FIG. 15 is a vertical section through an alternate embodiment of the container of this invention whose lid is sealed to the inside surface of the container side wall. More particularly, FIG. 15 shows a container 61 having a side wall 62, an outwardly flared or stepped marginal end portion 64 having a passageway opening 63 therethrough. The container is sealed by a lid 66 recessed into the container body and sealed about its peripheral marginal edge portion at 68 (lower seal) and 69 (upper seal). The upper seal is optional. In this embodiment the testing fluid is injected through opening 63 and tests seal 68.

I claim:

1. A container comprising a container body and a lid sealed thereto, said container being adapted to have said seal tested for leakage, wherein:

said container body has a side wall, a bottom wall, a top opening and a top peripheral surface extending from about said top opening;

said top surface having a top face, divided into inner, central and outer peripheral portions; said lid being sealed about said container top surface by a seal, said seal being potentially hermetic and about said inner and cuter peripheral portions, said, and at least one fluid passageway opening in said container in communication with the unsealed central peripheral portion and the ambient atmosphere exterior of said container, said at least one fluid passageway opening being formed prior to testing of the seal.

2. A container according to claim 1 wherein said passageway opening is in said container body.

3. A container according to claim 2 in which the at least one fluid passageway opening comprises at least one groove.

4. A container according to claim 2 in which the at least one fluid passageway opening comprises at least one bore.

5. A container comprising a container body and a lid sealed thereto, said container being adapted to have said seal tested for leakage, wherein:

said container body has a side wall, an imaginary axis, a bottom wall, a top peripheral surface extending outwardly from, about and defining a top opening;

said top surface having a top face, a side surface and a peripheral channel in said top surface; said lid being sealed to said container top surface by a seal, said seal being potentially hermetic and about said top surface inward of said channel; and said peripheral top surface outward of said channel having at least one opening leading from said side surface to and communicating with said channel.

6. A container body as in claim 5 wherein there are two openings in the form of bores which extend radially inwardly in relationship to said axis.

7. A container body as in claim 5 wherein there are two openings in the form of grooves which extend radially inwardly in relationship to said axis.

8. A container body as in claim 5 wherein there are two openings positioned opposite from each other separated by about 180°.

9. A container body according to claim 5 wherein said peripheral top surface comprises a flange.

10. A container body as in claim 9 wherein there are two openings in the form of bores which extend radially inwardly in relationship to said axis.

11. A container body as in claim 9 wherein there are two openings in the form of grooves which extend radially inwardly in relationship to said axis.

12. A container body as in claim 9 wherein there are two openings positioned opposite from each other and separated by about 180°.

13. A container comprising a container body and a lid sealed thereon said container being adapted to have said seal tested for leakage, and after having been so tested being comprised of:

a flexible lid having a marginal edge portion thereabout, a top exposed face and a bottom face, said bottom face having an area comprised of a sealable plastic material;

a container body;

said container body comprising a side wall, a bottom wall, an open end portion opposite said bottom wall, and a flange portion extending outwardly from said open end portion;

said flange having a side edge, a top surface having an inner annular top surface area and a depressed outer top surface area; said seal comprising: (a) a seal of said inner annular top surface area to said lid bottom face and with said marginal edge portion extending outwardly over said depressed outer top surface area; and (b) a seal of said depressed outer top surface area to said lid bottom face of said marginal edge portion.

14. A container according to claim 13 wherein there is a downwardly depending connecting surface between the inner annular top surface and the outer top surface area.

15. A container according to claim 13 wherein said depressed outer top surface is annular.

16. A container as in claim 13 wherein said lid is a multi-layer laminate including a layer of metal foil.

17. A container as in claim 13 wherein said container body is a one-piece plastic member.

18. A container as in claim 13 wherein said flexible lid is a sheet.

19. A container comprising a container body and a lid sealed thereon, said container being adapted to have said seal tested for leakage, comprised of:

a flexible lid having a marginal edge portion, a top exposed face and a bottom face, said bottom face having a marginal edge portion which includes a sealable plastic material;

a container body;

said container body comprising a bottom wall and a side wall having a top terminal end portion which at least partially defines a top opening in said container body;

said seal being a seal of a portion of said top terminal end portion of said side wall to said lid marginal edge portion, said side wall terminal end portion having at least one opening therethrough above said seal said at least one opening being formed prior to testing of the seal.

20. A container according to claim 19 wherein there are two seals, one disposed axially lower than the other, said opening being positioned between said seals.

21. A container according to claim 20 wherein said seals are between said lid marginal edge portion and the inside surface of said side wall terminal end portion.

22. A container according to claim 19 wherein said flexible lid is a sheet.

23. A container comprising a container body and a lid sealed thereon said container being adapted to have said seal tested for leakage, comprised of:

a flexible lid having a marginal edge portion thereabout, a top exposed face and a bottom face, said bottom face having an area comprised of a sealable plastic material;

a container body;

said container body comprising a side wall, a bottom wall, an open end portion opposite said bottom wall and a flange portion extending outwardly from said open end portion;

said flange having a side edge, a top surface being an inner annular top surface area and a depressed outer top surface area, wherein said side wall rises to said top surface; and said seal being a seal of said inner annular top surface area to said lid bottom face and said marginal edge portion extending outwardly over said depressed outer top surface area, said depressed outer top surface area being in communication with the ambient atmosphere exterior of said container prior to testing of the seal.

24. A container according to claim 23 wherein there is a downwardly depending connecting surface between the inner annular top surface area and the outer top surface.

25. A container according to claim 23 wherein said depressed outer top surface is annular.

26. A container as in claim 23 wherein said lid is a multi-layer laminate including a layer of metal foil.

27. A container as in claim 23 wherein said container body is a one-piece plastic member.

28. A container as in claim 23 wherein said flexible lid is a sheet.

* * * * *